United States Patent Office 3,399,045
Patented Aug. 27, 1968

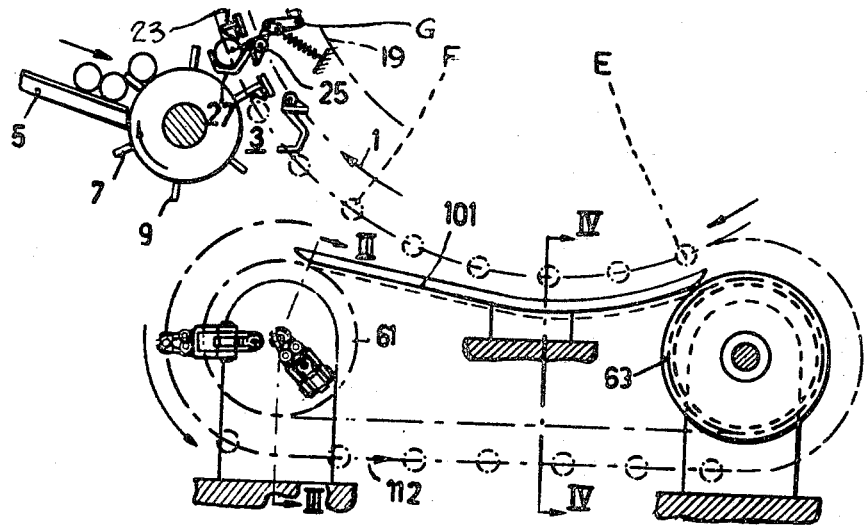
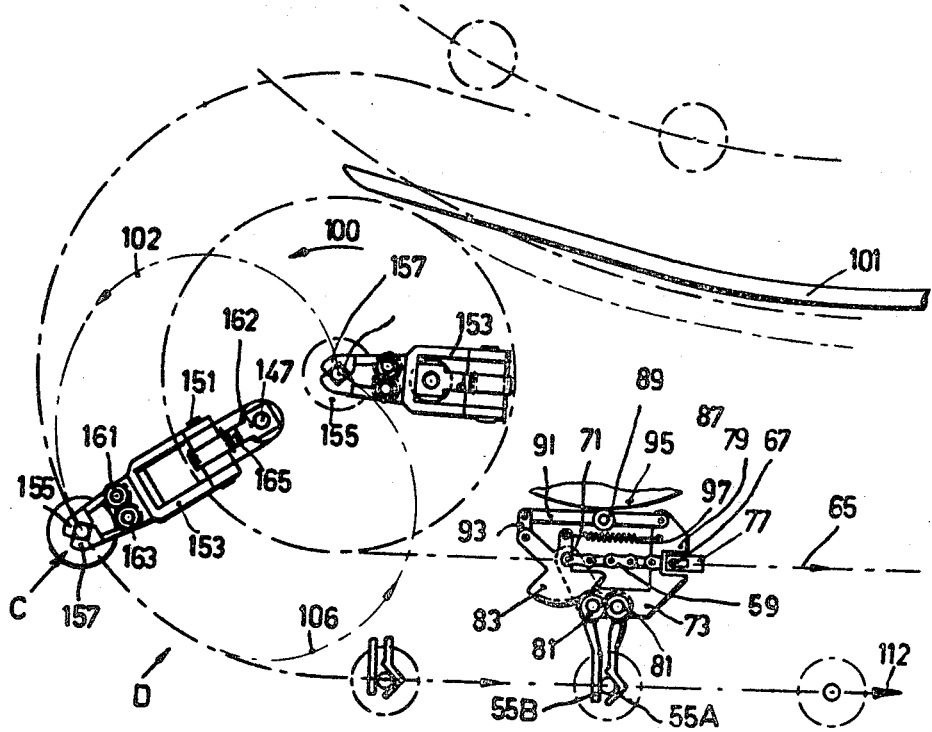

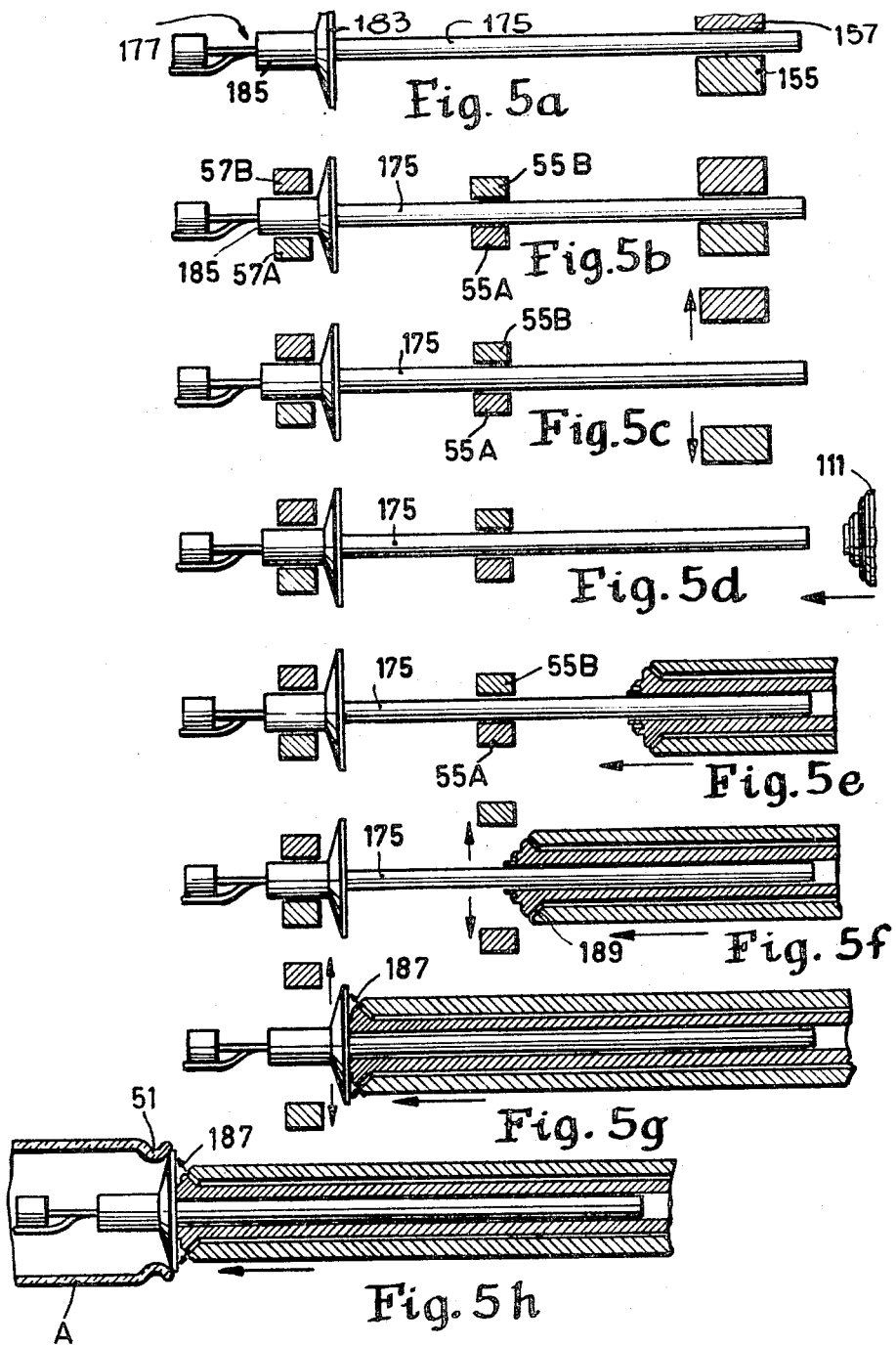

3,399,045
APPARATUS FOR FEEDING ARTICLES TO AN ENDLESS OR CLOSED PATH CONVEYOR
Anton Reynders, Emmasingel, Eindhoven, Netherlands, assignor to North American Philips Company, Inc., New York, N.Y., a corporation of Delaware
Filed July 6, 1964, Ser. No. 380,335
Claims priority, application Netherlands, July 11, 1963, 295,211
5 Claims. (Cl. 65—155)

ABSTRACT OF THE DISCLOSURE

A heat sealing machine for fluorescent lamps including a transfer apparatus which receives fluorescent lamp components from a supply source and discharges the components onto a conveyor. The transfer apparatus is attached to a rotating wheel, over which the conveyor passes. A lamp component is engaged by the apparatus at a first position of the rotating wheel. After receiving the component the apparatus both rotates the component in the direction of the wheel and pivots the component in a direction parallel to the wheel axis thereby aligning the component with the conveyor. At this aligned position the lamp component is then transferred from the apparatus to a component holding means on the conveyor, while rotation of the wheel continues.

---

Figure 3:
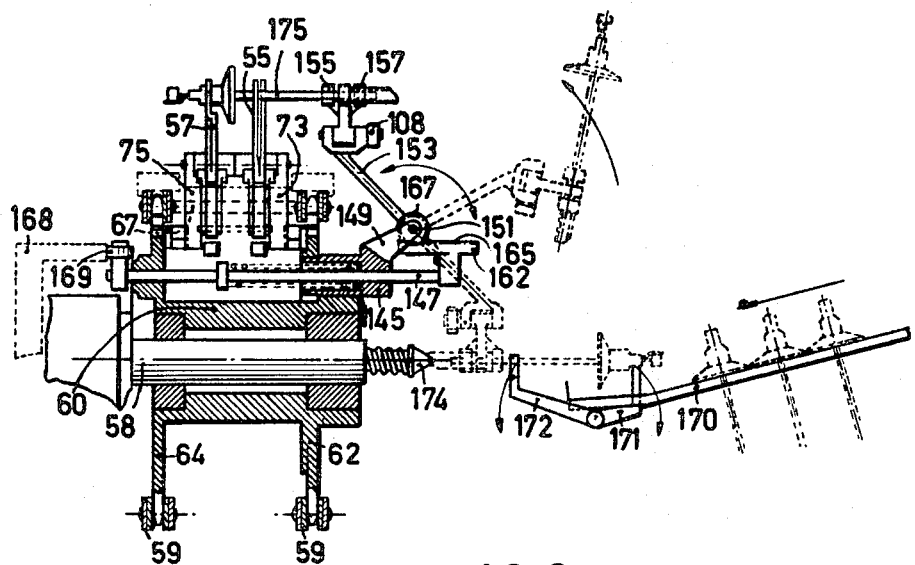

This invention relates to apparatus for transferring electrical components, particularly components used in the manufacture of fluorescent lamps, from a supply source onto a high speed conveyor and also transferring the components from the conveyor to another conveyor or the like.

In the prior art, it is known to manually feed lamp components onto a conveyor which then transports the components to the various assembly stations. Reciprocating mechanisms are also used to transfer lamp components from a supply source to a moving conveyor. The primary disadvantages of the manual feed technique are that a high speed conveyor cannot be adequately or safely supplied. Reciprocating mechanisms for high speed operation entail the use of large and expensive structures since the inertia forces accompanying the reciprocating machinery must be overcome. Additionally, the return stroke of such reciprocating mechanisms inherently includes a non-producing time period during the return stroke.

In view of the foregoing, it is one of the principal objects of the invention to provide a rapid and reliable transfer apparatus for feeding lamp components to a conveyor.

Another object of the invention is to provide a transfer apparatus which is synchronized with the conveyor and performs its operations in a continuous cycle.

A further object of the invention is to provide transfer apparatus which will transport lamp stems from a supply source to a conveyor wherein the lamp stems are engaged by the apparatus, aligned with the conveyor and then transferred to the conveyor.

It is a further object of this invention to provide an apparatus which is particularly useful for feeding fluorescent lamp stems to the machine described in co-pending application Ser. No. 380,238 of which I am a co-inventor.

In accordance with the invention a conveyor is coupled with a transfer apparatus in which the transfer apparatus transfers a plurality of lamp components or the like from a supply source to the conveyor in rapid succession. More particularly, this apparatus includes a series of transfer members attached to a rotating wheel, around which an endless chain conveyor moves. The transfer apparatus receives lamp stems for fluorescent lamps at one position of the wheel during rotation of the wheel; it then aligns these lamp stems with the conveyor and discharges the lamp stems onto holder elements on the conveyor. The lamp stems are then transported on the conveyor to a lamp tube holding device and synchronously aligned therewith. At this time, the lamp stems are inserted into the lamp tubes located on the lamp tube holder. After insertion into the lamp tubes but during transfer the lamp stems are heat sealed to the lamp tubes.

The transfer apparatus which is attached to the wheel on the first conveyor, receives the lamp stem at the center of rotation of the wheel while rotating with the wheel. During the continuing rotation the transfer apparatus moves the lamp stems into alignment with the conveyor passing around the periphery of the wheel and discharges the lamp stems into holders on the conveyor. During the period of discharge the velocity and angular rotation of the transfer apparatus is synchronized with the movement of the conveyor.

Figure 4:
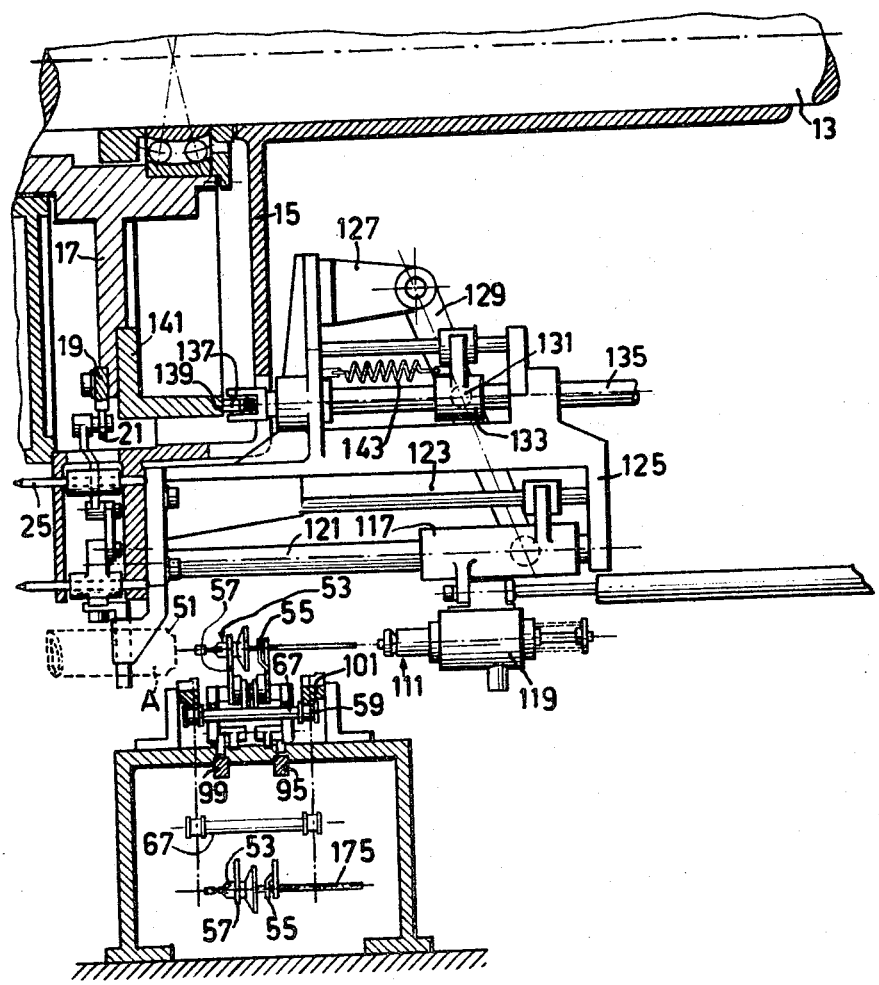

In order that the invention may readily be carried into effect, an embodiment thereof will now be described, by way of example, with reference to the accompanying drawings, in which:

FIG. 1 is a schematic front elevation of part of a sealing machine for sealing stem mounts one to each end of a tube conveyed in the horizontal position, FIG. 2 shows a portion of FIGURE 1 to an enlarged scale, FIG. 3 is a sectional view of a chain wheel taken on the line III—III of FIGURE 1, FIG. 4 is a sectional view taken on the line IV—IV of FIGURE 1, a few components being shown in elevation for the sake of clarity, and FIGS. 5a to 5h illustrate the transfer sequences relating to the lamp stem.

The apparatus shown schematically in FIGURE 1 includes a series of pincer-shaped holders 3 mounted on a lamp-tube-holder device and arranged to move in the direction of the arrow 1 by means of which a plurality of tubes may be held in a horizontal position and evenly spaced in a circle concentric with the axis of rotation thereby defining a closed path. A supply channel 5 for tubes terminates at the said apparatus, the tubes being distributed by a transport roller 9 provided with blades 7 to the temporarily passing opened pincer-shaped holders 3. Each lamp tube is held at both ends in such a pincer-shaped holder (see tube A drawn in broken lines in FIG. 4).

The apparatus includes a central shaft 13 to which a frame 15 is secured. The frame is rotatable with respect to a stationary part 17 consisting of several components. The part 17 includes a camway 19 over which followers 21 of the pincer-shaped holders 3 are guided on rotation of the frame 15. The pincer-shaped holders 3 comprise a "fixed" jaw 23 secured to the frame 15 and a "movable" hooked jaw 27 adapted to pivot about a pin 25. The hooked jaw 27 forms part of a lever system controlled from the camway 19. The camway 19 is so shaped that the pincers are successively opened and enabled to receive tubes fed by the channel 5 and are then closed. During their transport by the holders 3 the horizontally held tubes cannot rotate about their axes. Initially the tubes at their ends are open and shouldered at 51 by a suitable rolling operation (see tube A in FIGURE 4).

A stem mount 53 is to be conveyed to each open end of the tube A and to be sealed thereto. For this purpose a plurality of lamp-stem mounts 53 are held between jaws 55A and 55B and jaws 57A and 57B of pincers 55 and 57 secured to an endless chain conveyor 59 (FIG- URES 2 and 3). The pincers travel in a closed path defined by the endless chain 59. The supply chain for the mounts, which in actual fact comprises two chains, is arranged to move over wheels 61 and 63. Wheel 61 consists of a hub 60 mounted for rotation on a shaft 58 and has flanges 62 and 64 acting as chain sprockets. The double chain is adaped to be driven in the direction indicated by the arrow 65 of FIGURE 1. The individual chains which comprise double chain 59 engage the sprockets 62 and 64 respectively and are coupled by connecting spindles 67. The double chain 59 engages the lamp-stem mount by means of the pincers 55 and 57 and convey them at a constant speed. The pincers 55, 57 engage different portions of the stem mounts.

The construction of one of the pincers on the chain 59 is shown in greater detail by FIGURE 2. Bridge pieces 73 and 75 are secured to adjacent spindles 67 and 71 of a double chain 59. The spindle 67 is secured in a slide block 77 arranged to be displaced by spring action in a recess 79 of the bridge piece 73 to permit of automatic adjustment of the correct spacing between the spindles 67 and 71, which spacing is slightly reduced when the bridge piece runs over the chain wheel 61. The bridge piece 73 further includes pivot pins to which jaws 55A and 55B each provided with a pinion 81 are secured. A stem mount 53 may be held between the jaws. The pinions mesh with one another and are rotated together by means of a toothed quadrant 83 adapted to pivot about a pin 71 secured in the bridge piece 73. A lever 91 carrying a cam follower 89 is adapted to pivot about a pin 87 and hinged to a coupling rod 93 which is hinged to the quadrant 83. The cam follower 89 cooperates with a camway 95. A draw spring 97 is stretched between the pin 87 and the quadrant 83 to urge the cam follower to the camway 95. The pincers 57 are similarly controlled, the jaws 57A and 57B being operated by means of a camway 99.

The apparatus further comprises a fixed guide 101 which causes the double chain 59 to describe a predetermined path. Viewed with respect to the guide 101 the longitudinal axes of the stem mounts held by the pincers of the chain 59 perform an accurately determined translatory movement.

The apparatus further comprises a plurality of burners each arranged opposite one end of a tube, as shown in FIGURE 4 with respect to a burner 111. Each burner 111 is axially displaceable in a sleeve 119 attached to a slide 117. The slide 117 is displaceable over a guide constituted by spindles 121 and 123. The said spindles are mounted in a U-member 125 secured to the rotatable machine frame 15. The U-member 125 has a lug 127 to which a rod 129 is hinged. The other end of the rod 129 is coupled by means of a slot-and-pin connection to the slide 117. The rod 129 has a pin 131 located at a position intermediate the two ends and enclosed in a slot of a block 133. The block 133 is secured to a spindle 135 which is displaceably supported by the U-member 125. The spindle 135 carries a roller 137 which cooperates with a lateral surface 139 of a stationary camway 141. The block 133 is urged to the surface 139 by a draw spring 143. At each position of the apparatus a separate U-member 125 is provided which accommodates only a single burner 111. On rotation of the frame 15 the roller 137 will move over the camway 141 and determine the axial movement of the spindle 135. Thus the slide 117 and hence the burner 111 are moved towards or away from the tube A by the said control. In FIGURE 4, the components of the burner and its movement are shown in elevation for the sake of simplicity.

The burner has a central duct into which the stem of a stem mount 53 may be inserted. The flames emerging from the burner diverge conically (FIGURE 5g).

A sleeve 145 through each of which an axially displaceable spindle 147 passes is secured to the side of the chain wheel 62 (FIG. 3). In practice a number of sleeves 145 are employed on wheel 61. To each sleeve 145 is secured a support 149 in which a spindle 151 is rotatably mounted. A U-shaped arm 153 pivots about the said spindle. In FIG. 2 two of these arms 153 are shown, one in each of the extreme positions of movement. A gripping member in the form of a pincer having jaws 155 and 157 is attached to the end of the said arm and is capable of holding a stem mount by the stem 175. The jaws 155 and 157 are each provided with a pinion 161 and 163 (FIG. 2) similarly to the jaws 55A and 55B of FIGURE 2. The pinions (161, 163) mesh with one another, and the jaws 155 and 157 are maintained in a closed position by a spring (not shown). A member 162 mounted on the spindle 147 includes a toothed rack 165 cooperating with a pinion 167 secured to the spindle 151. Thus displacement of the spindle 147 in the sleeve 145 permits the arm 153 to assume various positions. The said positions are shown by broken lines in FIGURE 3. The movement of the spindle 147 is derived from a flanged disc 168 behind wheel 61 cooperating with a cam-follower 169 connected to the spindle 147. The cam follower 169 is urged to the flanged disc 168 by spring action. By means of the said flanged disc the arm 153 may be pivoted between two extreme positions. One of the said positions is at the center of rotation of the sprockets 62, 64 and the other is in the plane of movement of the pincers 55, 57 so that the arm 153 is enabled to cooperate with the pincers 55 and 57 of the chain 59. In the said two extreme positions, which hereinafter are referred to as the transfer positions, the stem portion 175 of a stem mount is arranged horizontally.

A supply chute 170 for the stem mounts terminates adjacent the center of wheel 61 approaching FIG. 1 in a plane normal to the plane of the drawing. Along this chute the mounts move towards the said center of rotation by gravity. During this movement the stem portions of the stem mounts extend downwards. At the end of their movement the mounts are brought into a horizontal position by arms 171 and 172 shown schematically.

The operation of the apparatus is as follows:

Starting at the instant which the stem of the stem mount points towards the center of rotation of the chain wheel 61 or sprockets 62, 64 and the jaws 155 and 157 of the arm 153 close about the stem portion. This is made possible by the fact that during the horizontal movement of the stem mount towards the center of rotation a central stud 174 pushes apart the jaws 155 and 157 temporarily. For this purpose the stud 174 is capable of periodical axial movement. During rotation of the chain sprockets 62, 64 in the direction indicated by the arrow 100 of FIGURE 2 the toothed rack 165 is shifted and the associated U-shaped arm 153 is pivoted from the center of rotation to a larger diameter. However, the spindle 151 moves with the same angular velocity as that of the chain wheel 61 since it is attached thereto. The arrangement is such that the stem mount concerned is brought from the center of rotation to a larger diameter along a path 102 of FIGURE 2. The relevant pincers on the chain wheel (wheel pincers 55) are then rotated from the initial position to a position C (FIGURE 2). Thus, in the position C the jaws 155 and 157 are in an aligned position with the conveyor chain. On further movement of the pincers 55 in a direction indicated by the arrow 100 there is ample opportunity to transfer a stem mount carried by the jaws 155 and 157 to the pincers 55 and 57 of the double chain 59 which simultaneously travel along the said larger diameter. It will be noted that along the path C–D the pincers 57 and 55 secured to the chain must initially be opened. This is effected by cooperation with the camways 95 and 99 which are also provided at the location of the sprockets 62 and 64. At the end of the path C–D, after the pincers 55 and 57 of a chain 59 (chain pincers) have successively taken over the stem mount concerned, the jaws 155 and 157 of the wheel pincers are opened by the cooperation of a lever 108 (FIG. 3) coupled to one of the pinions 161 and 163 with a guideway (not shown) of limited length. On further movement of the chain wheel in the direction indicated by the arrow 100 of FIGURE 2, the jaws 157 and 155 are returned in closed condition by a pivoting movement of the arm 153 in the opposite direction to the center of rotation of the wheel. At the center of rotation the jaws are again opened by the aforementioned central stud 174 so as to enable them to grasp another stem mount at the center of rotation. In FIGURE 2, the return movement of the jaws 155 and 157 of the wheel pincers is indicated by the curve 106. The operation of the various pincers is illustrated in FIGURE 5, in which FIGURE 5a shows the position in which a lamp stem 177 is held only by its stem portion 175 by the jaws 157 and 155 of the relevant wheel pincers. FIGURE 5b shows the the situation in which for part of the path C–D the stem mount is also carried by pairs of jaws 55A, 55B and 57A, 57B of the chain pincers with the same angular velocity. FIGURE 5c shows the situation in which the stem mount 177 is carried only by the chain pincers 55, 57 which are moving in the direction indicated by an arrow 112 (FIG. 2). The pincers 55 and 57 grip different portions of the stem mount 177. The jaws of the pincers 55 grip the stem portion 175 and the jaws of the pincers 57 grip a cylindrical glass portion 185 of the said mount. During the further movement of the chain 59 in the direction indicated by the arrow 112 the stem mount 177 passes over the other chain wheel 63 and describes the path indicated by E–F (FIG. 1) along which the guide means 101 is arranged by which the mounts are guided along an accurately determined path. The said path E–F may be considered as a transfer path, because the holders 3 arranged to be moved in the direction indicated by the arrow 1 and the burners 111 of the sealing machine arranged to be moved in synchronism with the said holders follow exactly the same path. The situation at the beginning of the path E–F is shown in FIGURE 5d. While the pincers 55, 57, the burner 111 and the stem mount 177 travel along the path E–F the burner 111 is at the same time moved towards the stem mount so as to surround the stem portion 175 (FIGURE 5e). The movements of the pincer jaws 55A and 55B are so controlled that on further movement of the burner 111 over the stem portion 175 the jaws 55A and 55B are retracted (FIGURE 5f). While the mount is still held by the cylindrical portion 185 the head of the hollow burner is moved until it strikes the flanged portion 183 of the stem mount. At this instant the burner is ignited and flames 187 emerge from a conical burner slit 189 so as to heat the rim of the flanged portion 183. In this situation (FIGURE 5g) the jaws 57A and 57B are also retracted in the manner shown, the mount now being carried only by the burner 111. In this situation substantially the entire path E–F has been described and the pincers 55 and 57 have delivered their load and subsequently the pincers while still open arrive again near the wheel 61. The burner 111 which has taken over the mount 177 moves further, as indicated by the arrow 1, and finally arrives at the position G in which in the meantime a tube has been fed by the supply channel 5 to the associated holders 3. From the resulting situation the burner 111 may be moved to the tube end while the flanged portion 183 of the stem mount is heated by the conically emerging flames so that the situation shown in FIGURE 5h is produced. The movement of the tube together with the stem mount is then continued in the direction indicated by the arrow 1, during which movement sealing takes place.

The above description relates to a single stem mount and a single pair of pincers. In actual fact five such pincers are secured to the side of the sprocket 62. The pivots 151 of the said arms have an angular velocity relative to the center of rotation which corresponds to that of the chain pincers 55, 57 when moving over the sprocket 62. A transfer apparatus for feeding stem mounts, in a continuously working sealing machine for sealing stem mounts to both ends of horizontally held tubes must be located on each side of the machine. It is not necessary to wait until an arm 153 has delivered a stem mount before a new stem mount may be taken up from the center of rotation. When a stem mount is removed a small distance from the center of rotation it has already assumed a different angular position with respect to the wheel 61 so that the next stem mount may immediately be fed to the center of rotation of the wheel 61 and grasped by the next wheel set of pincers.

What is claimed is:
1. Apparatus for feeding components to a chain conveyor having a plurality of equally spaced component holding means, comprising conveyor means for moving said component holding means in a closed path, a wheel means wherein said conveyor and holding means overlies a portion of said wheel thereby defining an arcuate path, means for delivering components to said wheel means approximately at the axis of rotation thereof, at least one transfer means having a support mounted on said wheel means adjacent the periphery thereof, said transfer means being positioned relative to said wheel in a radial plane occupied by at least one of the component holder means of said conveyor in traversing said arcuate path; said transfer means comprising an arm supporting movable gripping jaws, said arm being pivotally mounted on said support for movement of said gripping jaws in a plane normal to said wheel and positioning said gripping jaws in a first position at said axis of rotation of said wheel for receiving a component, and in a second position adjacent the component holding means in said radial plane, and means operatively connected with said arm for pivoting said arm.

2. Apparatus for feeding articles to a chain conveyor according to claim 1 wherein said means connected with said arm for pivoting said arm comprises, a tooth rack, a pinion at the pivot axis of said arm engaging said rack, a push rod connected with said rack, said rod extending axially through said wheel, and cam means engaging said rod for moving said rack.

3. Apparatus for feeding articles to a chain conveyor according to claim 2 wherein a plurality of transfer members are angularly spaced about the periphery of said wheel means.

4. A machine for manufacturing fluorescent lamps comprising a plurality of lamp-tube-holder means for supporting lamp tubes in a substantially horizontal plane, means for moving said lamp-tube-holder means in a first closed path, an equal plurality of burner means connected with said first-named means adjacent said lamp-tube-holder means, means for supporting said burner means for movement in a horizontal plane normal to said first path closed, means for moving said burner means in said horizontal plane, a plurality of lamp-stem-holder means for supporting lamp stems in a horizontal plane, conveyor means for moving said lamp-stem-holder means in a second closed path having a portion corresponding with said first closed path and in which said lamp tubes, lamp stems and burner means are axially aligned; said second closed path having an arcuate portion defined by said conveyor means overlying a portion of a rotatable wheel, means for delivering said lamp stems to said wheel adjacent the axis of rotation thereof, a plurality of transfer means having a support mounted on said wheel adjacent the periphery thereof, each of said transfer means having an arm pivotally connected with its associated support, each of said arms being radially disposed relative to said wheel and residing in a radial plane occupied by a lamp-stem-holder means traversing said arcuate portion of second path, gripping jaws connected with said arm, means for pivoting said arm for moving said gripping jaws from a position adjacent said axis to a position adjacent a lamp-stem-holder in said second path.

5. A machine for manufacturing fluorescent lamps according to claim 4 wherein said means for pivoting said arms comprises a plurality of toothed racks and associated pinions operatively connected with each said arm, a push rod connected with each said rack, said rods extending axially through said wheel, and cam means engageable with said rods for moving said rack and pivoting said arms in synchronization with said lamp-stem-holders.

References Cited

UNITED STATES PATENTS

| | | | |
|---|---|---|---|
| 2,940,220 | 6/1960 | Roeber | 65—155 XR |
| 3,004,675 | 10/1961 | Roeber | 65—155 XR |
| 3,113,011 | 12/1963 | Gilbert et al. | 65—155 XR |

DONALL H. SYLVESTER, *Primary Examiner.*

F. W. MIGA, *Assistant Examiner.*